(12) United States Patent
Henson et al.

(10) Patent No.: US 6,273,670 B1
(45) Date of Patent: Aug. 14, 2001

(54) UNIVERSAL TIRE STACKING AND PALLETIZING END EFFECTOR ASSEMBLY AND SYSTEM AND METHOD OF USING SAME

(75) Inventors: Michael L. Henson; David L. Hayes; Joseph L. Glenn, all of Silsbee, TX (US)

(73) Assignee: C & D Robotics, Inc., Beaumont, TX (US)

( * ) Notice: Subject to any disclaimer, the term of this patent is extended or adjusted under 35 U.S.C. 154(b) by 0 days.

(21) Appl. No.: 09/431,300

(22) Filed: Oct. 29, 1999

Related U.S. Application Data

(60) Provisional application No. 60/106,306, filed on Oct. 30, 1998.

(51) Int. Cl.$^7$ ........................................ B66C 1/22
(52) U.S. Cl. ..................... 414/796.9; 414/795.7; 414/910; 206/304; 209/583; 242/578; 294/95; 294/97
(58) Field of Search ............... 414/796.9, 796.7, 414/910, 911, 429, 27, 623; 209/583, 587, 3.3; 248/346.02, 346.03; 206/303, 304; 108/53.1, 55.3, 149; 294/97, 95; 242/571, 578, 584, 586.3

(56) References Cited

U.S. PATENT DOCUMENTS

| 1,450,084 | 3/1923 | Hull . |
| 2,541,626 | 2/1951 | Whitcroft ................................ 214/1 |
| 2,928,540 | 3/1960 | Cunningham ........................ 206/65 |
| 3,012,663 | 12/1961 | Thorne ................................ 206/65 |
| 3,472,466 | * 10/1969 | Rutschi ............................. 242/584 |
| 3,547,258 | 12/1970 | Black .................................. 206/65 |
| 3,809,423 | * 5/1974 | Gazuit ................................. 294/88 |
| 4,105,486 | 8/1978 | Cantarutti ....................... 156/405 R |
| 4,306,826 | 12/1981 | Detwiler .............................. 414/27 |
| 4,778,060 | 10/1988 | Wessner, Jr. ........................ 209/3.3 |
| 4,792,049 | 12/1988 | Janoick et al. .................... 209/556 |
| 5,586,649 | 12/1996 | Hsiao ................................ 206/303 |

FOREIGN PATENT DOCUMENTS

| 58-130825 | 8/1983 | (JP) . |
| 5-39128 | 2/1993 | (JP) . |

OTHER PUBLICATIONS

C & D Robotics, Drawing entitled "Tire Handling End Effector," Mar. 25, 1996.
C & D Robotics, Drawing entitled "Robot Layout," Apr. 1, 1995.

\* cited by examiner

*Primary Examiner*—Douglas Hess
(74) *Attorney, Agent, or Firm*—Akin, Gump, Strauss, Hauer & Feld, LLP

(57) ABSTRACT

A robotic tire end effector apparatus and system including a method for picking up and placing tires positioned horizontally onto vertical stacks of tires. The apparatus and system includes a totem support assembly having a support housing and support bars capable of bearing against the inside diameter of a tire bead and a bottom assembly mounted to the support housing of the totem support assembly. The bottom assembly includes pivot arms and fingers. The fingers are capable of bearing against the inside diameter of the tire bead and supporting the weight of the tire. The support bars are also capable of supporting the weight of a tire. The system includes a computer and program capable of receiving data from the tires for identification, tracing tire location, allocation, pick optimization and continuous calculation of sorting and pick options. The method of use of the apparatus includes positioning the end effector assembly over the top and center of the stack of tires and lowering the end effector assembly through the bead diameters of the stack of tires with the lower pivot arms and the upper support bars in their fully retracted position. The lower pivot arms are pivoted until the fingers firmly bear against the inside diameter of the bead of the lowermost tire. The support bars are extended outwardly until the support bars firmly bear against the inside diameter of the upper tires of the stack. The stack is raised by the end effector assembly to lift the stack of tires.

15 Claims, 13 Drawing Sheets

UNIVERSAL TIRE STACKING AND PALLETIZING END EFFECTOR ASSEMBLY AND SYSTEM AND METHOD OF USING SAME

RELATED APPLICATIONS

The present application claims priority from Provisional Application Serial No. 60/106,306 filed on Oct. 30, 1998. Applicant hereby incorporates by reference Provisional Application Serial No. 60/106,306 in its entirety.

BACKGROUND OF THE INVENTION

1. Field of the Invention

The present invention relates to a method and apparatus for picking and placing tires onto stacks as well as picking and placing stacks of tires onto pallets or conveyors.

2. Description of the Related Art

Tires for automobiles and other vehicles come in all different sizes and types. Tires are made to fit various wheel or rim diameters. The term "bead" is used to refer to the inner diameter of the tire. For example, a 14-inch bead tire is for a 14-inch diameter wheel or rim. In addition to the bead, tires are also sized by their width and outside diameter (O.D.) Various width tires are made in each of the bead sizes. Similarly, various outside diameter (O.D.) tires are made for each of the bead and width sizes. Thus, a 14-inch bead tire may have any of a variety of widths and/or heights associated with it. Vehicle tires have a bead typically in the range of 13 inches to 20 inches.

In addition to the above dimensional properties of tires, tire manufacturers make a variety of tread types and side wall types for particular sizes of tires. Thus, it is easy to understand that a tire manufacturer makes a large number of types of individual tires. During the manufacture of the tires, the finished tires are typically transported by conveyor to the end of the manufacturing line. Upon reaching the end of the manufacturing line. the tires are palletized in preparation for shipping or transportation. Typically, the tires coming off the manufacturing line include a variety of different types of tires. Oftentimes, it is desirable that the tires be placed onto stacks according to the type of tire.

Previously, a robotic tire end effector assembly, designed by C&D Robotics of Beaumont, Tex., has been used to pick a single tire from the end of the conveyor line and place the tire onto a pallet. This process of picking and placing a single tire was repeated over and over and over again. Typically, a separate pallet was required for each of the tire types. Typically, four stacks of tires can be placed onto a pallet. This prior art robotic device picked up the tire by positioning a robotic tire end effector assembly within the bead of the tire. Three equidistantly spaced radial wings were then outwardly extended to bear against the lower bead of the tire.

It is desirable to have a robotic tire end effector assembly that is capable of picking up a stack of tires. It is also desirable to have a robotic tire end effector assembly that can pick up and transport a stack of tires without damaging the tires. It is also desirable that the robotic tire end effector assembly be capable of handling a variety of sizes and types of tires. It is also desirable to have a tire handling system that is quick, efficient, and reliable at picking up and palletizing tires of various types and sizes.

SUMMARY OF THE INVENTION

The present invention is for use in the tire manufacturing industry and provides a system for the automatic handling of finished tires without manual intervention. The present invention is a robotic tire end effector assembly that is capable of picking up and transporting a stack of tires without damaging the tires. The robotic tire end effector assembly is capable of handling a variety of sizes and types of tires. The present invention also includes a tire handling system that is quick, efficient, and reliable at picking up and palletizing tires of various types and sizes. Single, multiple, and stacks of tires can be handled by the robotic tire end effector. The weight of each tire is supported by its bead during handling which reduces the potential damaging the tires during handling.

The robotic tire end effector assembly picks up and places tires positioned horizontally onto vertical stacks of tires. The robotic tire end effector assembly includes a totem support assembly having a plurality of vertical support bars capable of bearing against the inside diameter of a range of tire beads and supporting the weight of such tires. A bottom assembly is connected to the lower end of the totem support assembly. The bottom assembly has a plurality of pivot arms with fingers connected thereto. The fingers are capable of bearing against the inside diameter of a tire bead and supporting the weight of the tire.

The present invention also includes a method of picking up a stack of tires with the robotic tire end effector assembly. The method includes the step of positioning the end effector assembly over the top and center of the stack of tires. The end effector assembly is lowered through the bead diameters of the stack of tires with the lower pivot arms and the upper support bars in their fully retracted position. The lower pivot arms are pivoted outwardly until the fingers firmly bear against the inside diameter of the bead of the lowermost tire. The support bars are then extended outwardly until the support bars firmly bear against the inside diameter of the upper tires of the stack. The support bars remove the weight of the upper tires from the lowermost tire in the stack. The end effector assembly is then raised to lift the stack of tires.

Additionally, the tire handling system of the present invention includes a computer with a computer program capable of receiving data from the tires for identification, tracing the tires, dynamic allocation of tires to the robotic tire end effector assemblies and stacking locations, tire pick optimization and the continuous calculation of sorting and pick up options for the conveyors, robots and stacking locations.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, in which.

DETAILED DESCRIPTION OF INVENTION

Figure 1:
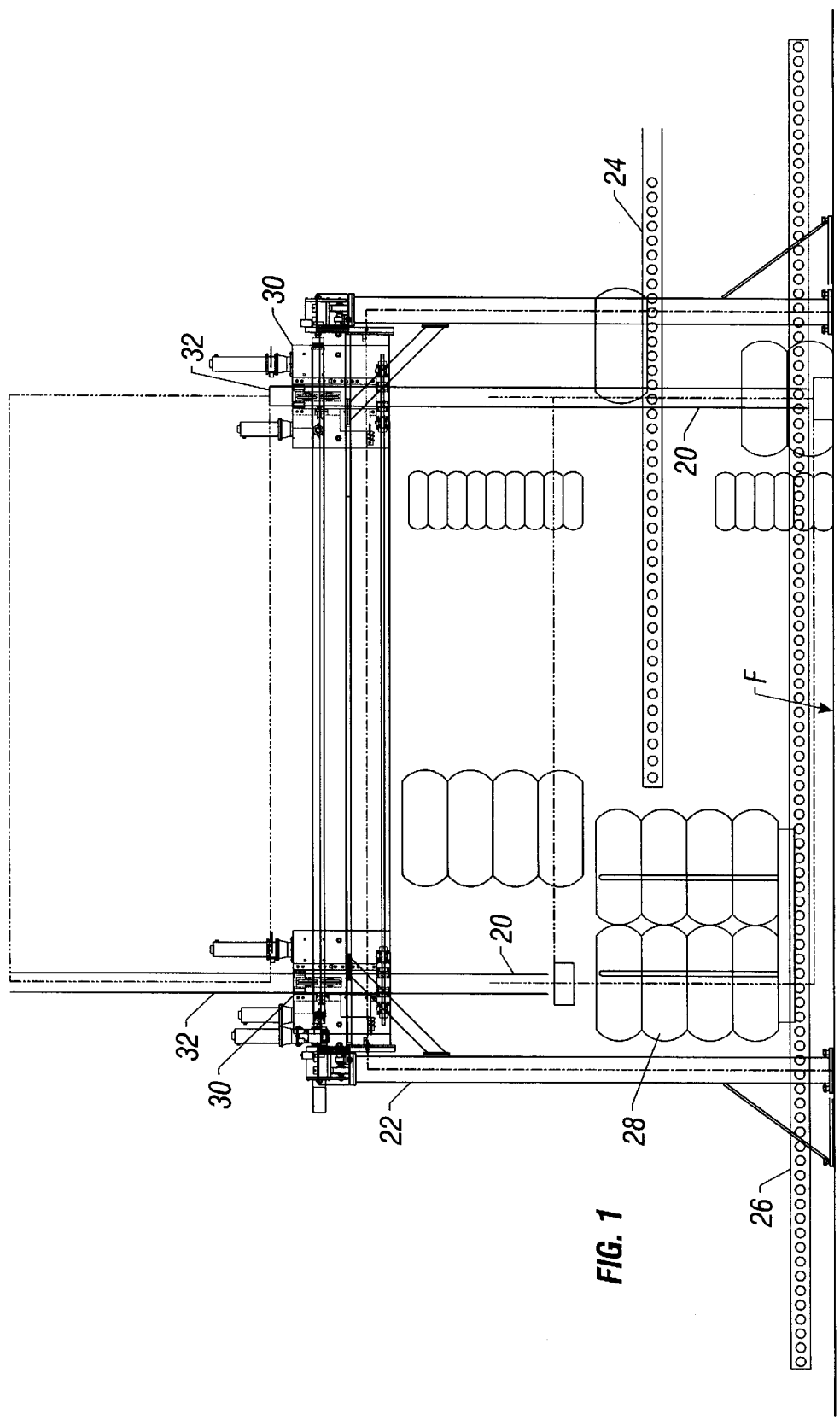
FIG. 1 is a diagrammatic elevation layout showing a gantry frame, an infeed conveyor, a palletized stack of tires, and picking and placing tires onto stacks on the floor with a robotic tire end effector assembly according to the present invention.
Figure 2:
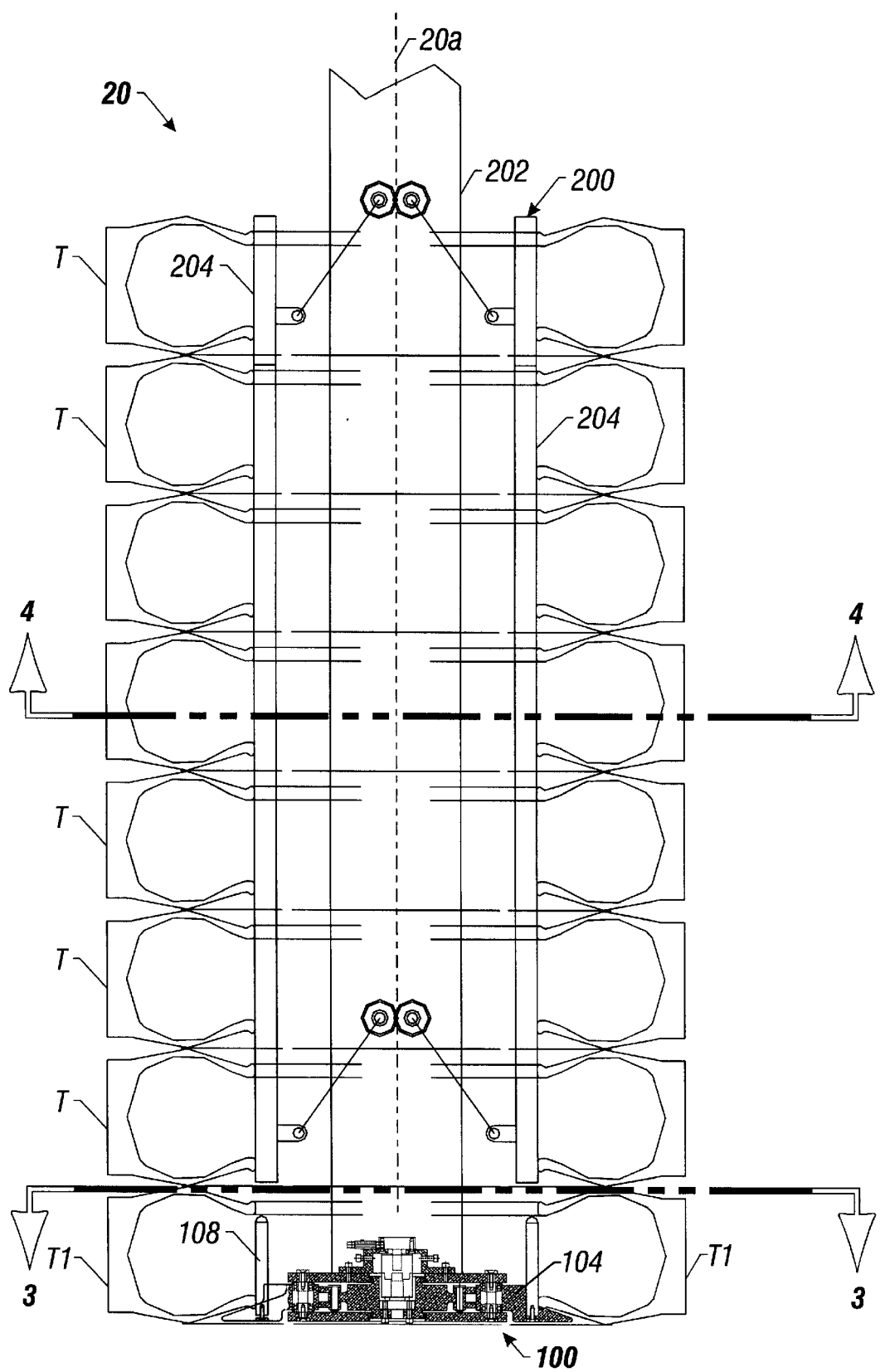
FIG. 2 is an elevation section view of a concept of a robotic tire end effector assembly of the present invention.

The present invention will now be discussed in detail with specific reference to the drawings. Referring to FIG. 2, the robotic tire end effector assembly, generally referenced as 20, comprises a bottom assembly 100 and a totem support assembly 200. The end effector assembly 20 is connected to a mast 32 of a manipulator 30 as shown in FIG. 1.

Figure 21:
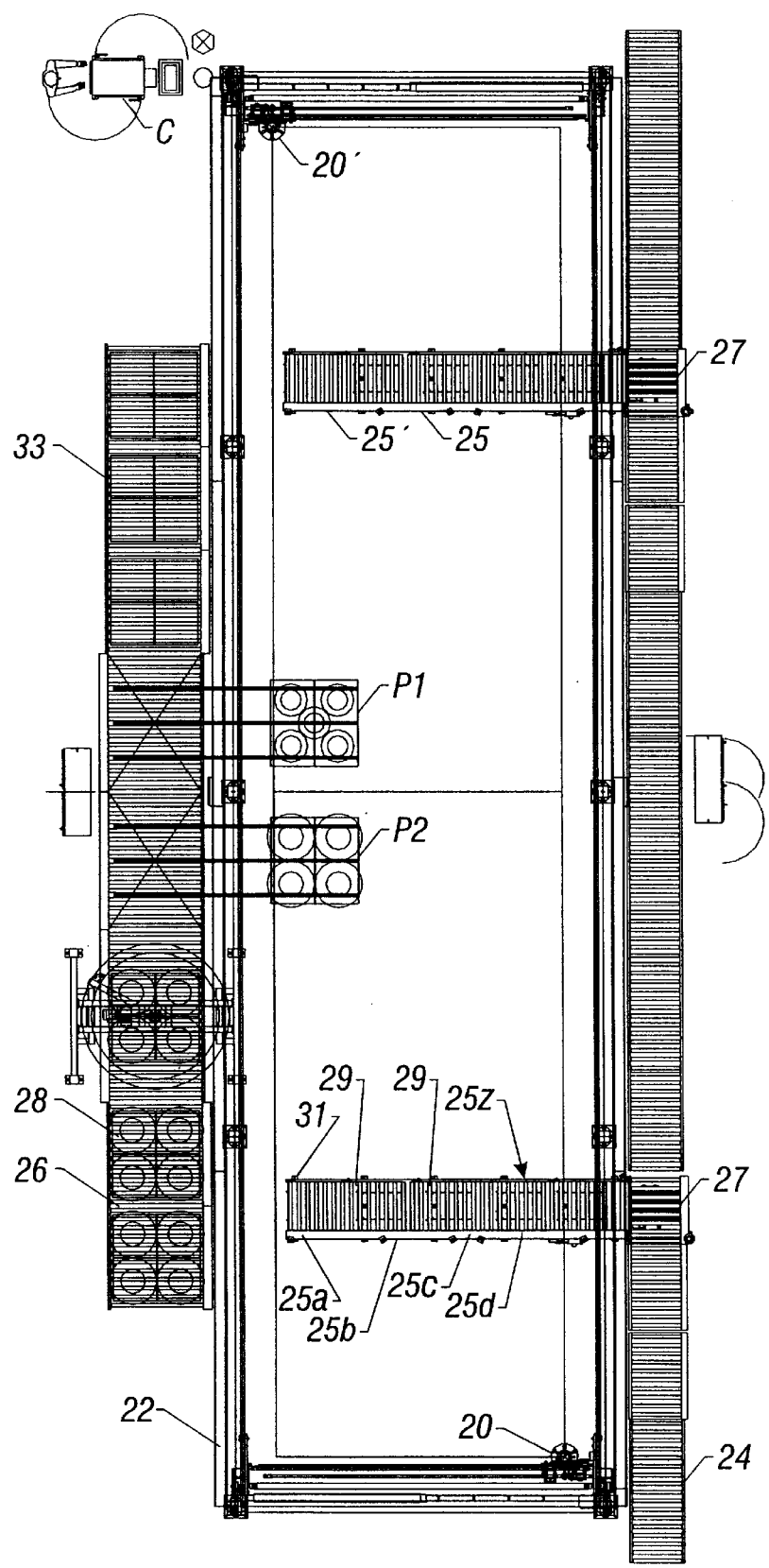
FIG. 21 is a top plan view of a typical tire palletizer system floor layout according to an embodiment of the present invention.

The robotic tire end effector assembly 20 is a part of a complete tire handling and palletizing system. FIG. 1 is a diagrammatic elevation layout showing some of the additional components of the complete tire handling and palletizing system. Referring to FIG. 1, the end effector assembly 20 is preferably mounted to the mast 32 of the manipulator 30. The manipulator 30 is mounted to a gantry frame assembly 22. It is to be understood that the gantry frame assembly 22 forms a robot superstructure that allows travel of the end effector assembly 20 along the orthogonal X-axis, Y-axis and Z-axis for reasons which will be explained below. Referring to FIGS. 1 and 21, the tire handling and palletizing system includes a tire infeed conveyor 24 that transports the finished tires from the end of the manufacturing process to the palletizing area. The tire handling and palletizing system may also include a tire outfeed conveyor 26 for the removal of a pallet of stacked tires 28. FIG. 1 also shows tires of different sizes being stacked onto the floor prior to placing the stacks onto a pallet.

It is to be understood that the tire infeed conveyor 24, tire outfeed conveyor 26, and the gantry frame assembly 22 are well known components to those of ordinary skill in the art. The arrangement and configuration of these components as shown in FIG. 1 is merely for illustrative purposes. FIG. 21 illustrates one preferred tire palletizer system layout drawing. Preferably, a tire pickup conveyor 25 delivers tires to the robot for pick & placing onto stacks. The pickup conveyor 25 may include a right angle transfer 27 for moving tires from a main or infeed conveyor 24 onto the pickup conveyor 25. Additionally, preferably a tire centering mechanism (not shown) interacts with the pickup conveyor 25 to locate the tire in the center of the pickup conveyor 25. Preferably, the tire centering mechanism comprises four centering pins on the outside diameter of the tire to center the tire. The pickup conveyor 25 preferably includes a plurality of rollers, which may include a chain drive and linkage to drive live rollers. Preferably, along the pickup conveyor path are a plurality of accumulation zones 25a, 25b, 25c, and 25d (generally referred to as 25z) partitioned by programmable pop up pin stops 29. The number of accumulation zones 25z can be adjusted based on the length of the pick up conveyor 25 and the largest outside diameter ("OD") of tire to be handled by the pick up conveyor 25. When the first tire arrives on the pickup conveyor 25 it will continue all the way to the end of the conveyor 25 where it is stopped by an end stop 31. The end stop 31 is at a fixed position at the end of the pickup conveyor 25 that stops the tire in a location for pickup by the robot end effector assembly 20.

Successive tires are stopped in each of the accumulation zones 25z beginning with the last zone before the end stop 31. Tires are accumulated consecutively on a first in basis. As tires are removed from the downstream accumulation zones (i.e. 25a), the pin stops 29 are retracted to allow the successive tires to advance toward the end stop 31. The plurality of accumulation zones 25z gives the robotic end effector assembly 20 a variety of tires to choose from. It also permits the pickup algorithm (explained below) to tell the robot to pickup more than one tire at a time.

It may be desirable to include sleeves, preferably fiber sleeves, over the live rollers. The sleeves provide enough friction to move an unrestrained tire. However when the centering mechanism or the pop up pin stops or the end stop, restrain the tire, the sleeve permits the roller to turn freely while the tire is stopped firmly by the pins.

Still referring to FIG. 21, the layout preferably includes two robotic tire end effectors 20 in each layout assembly and also two pickup conveyors 25. One or more spaces P1 and P2 located inside the gantry frame 22 are preferably designated for palletizing the tires. An empty pallet conveyor 33 outside the gantry frame 22 stores one or more empty pallets prior to moving to the palletizin spaces P1 and P2. After loading a pallet with tires, the pallet is moved onto the tire outfeed conveyor 26.

Figure 3:
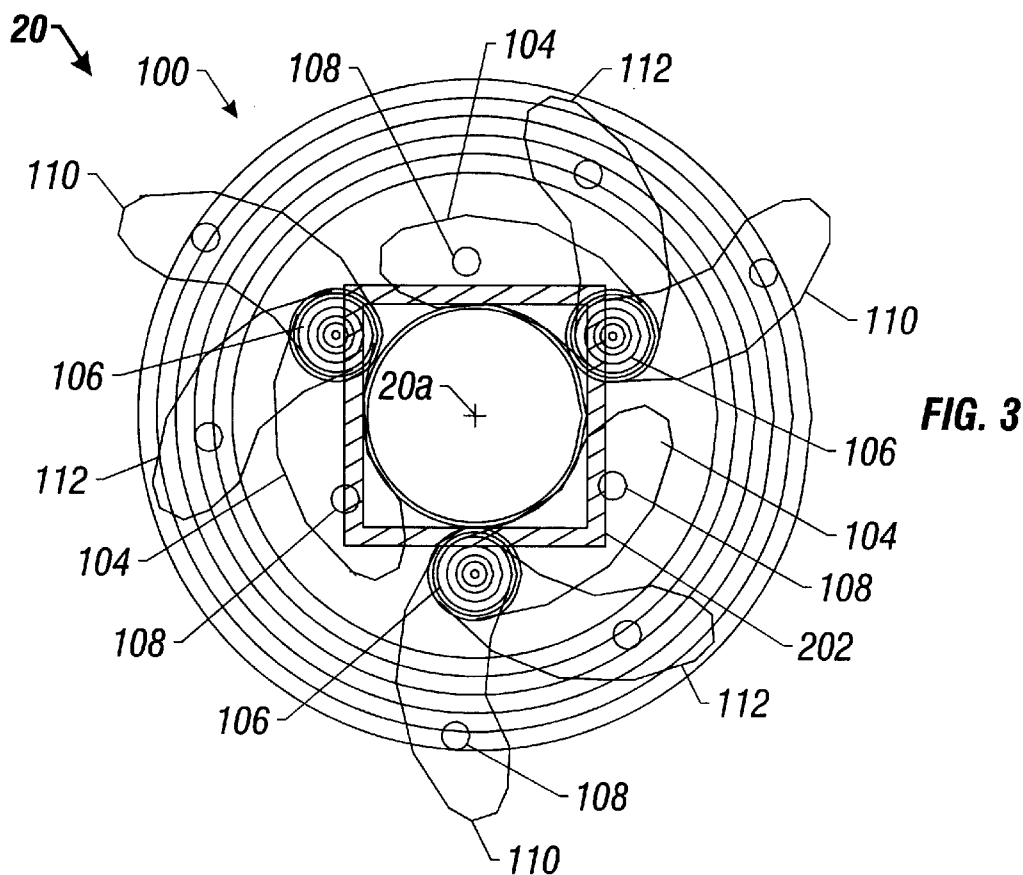
FIG. 3 is a view taken along line 3—3 of FIG. 2.

FIG. 2 is an elevation view illustrating the concept of the robotic tire end effector assembly 20 of the present invention. The bottom assembly 100 is shown positioned and mounted below the totem support assembly 200. Referring to FIGS. 2 and 3, the tire end effector assembly 20 includes an arm support housing 202 extending down to the bottom assembly 100. The bottom assembly 100 includes a plurality of pivot arms 104 which pivot about a pivot connection 106. The bottom assembly 100 is shown having three pivot arms 104 in FIG. 3. Each of the pivot arms 104 is shown in three different positions. The series of six concentric circles shown in FIG. 3 are representative of tires having a bead size of 13 inches (13"), 14", 15", 16", 17", and 18" respectively. Each of the pivot arms 104 includes a finger 108 extending upwardly from the pivot arm 104. The fingers 108 are adapted to contact the bead of the lowermost tire T1 during lifting. It is to be understood that the pivot arms and fingers 104 and 108, respectively, pivot about the pivot connection 106 until the fingers 108 bear against the bead of the respective tire T1 to be lifted. For example, if the tire T1 has an 18" bead, the pivot arms 104 will be radially extended to the position referenced as 110 whereas if the tire T1 has a 15" bead, the pivot arms 104 will rotate to the position referenced as 112 in FIG. 3. It is to be understood that this example is merely for illustrative purposes of showing the concept of the robotic tire end effector assembly 20 for picking up a variety of tire bead sizes.

Figure 4:
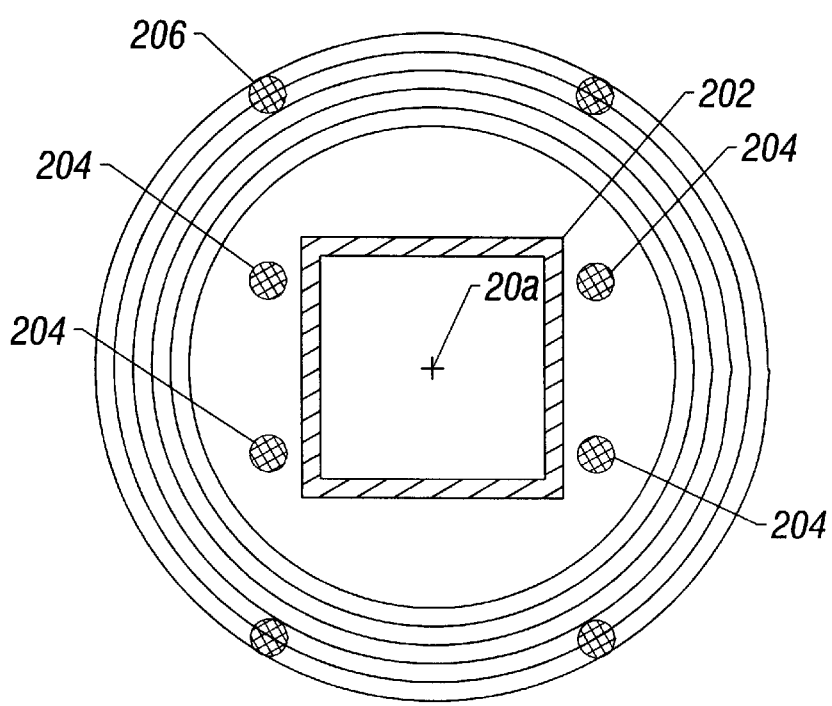
FIG. 4 is a view taken along line 4—4 of FIG. 2.
Figure 7:
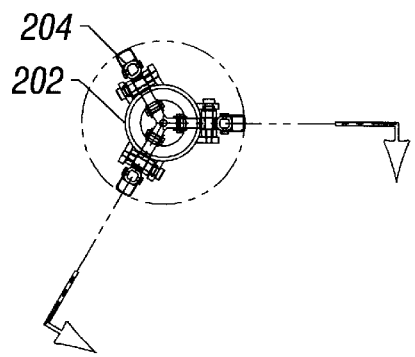
FIG. 7 is a view taken along line 7—7 of FIG. 5.

Referring to FIGS. 2 and 4, a plurality of support bars 204 are pivotably connected to the arm support housing 202. FIG. 4 shows four support bars 204 used in the end effector assembly 20. Referring to FIG. 4, the support bars 204 are adapted to pivotally extend until making firm contact with the bead of the tire T through a range of bead sizes. For illustrative purposes, FIG. 4 includes six concentric circles to illustrate a range of tire bead sizes of 13" through 18". Preferably, the plurality of support bars 204 and the plurality of pivot arms 104 are capable of handling a similar range of tire bead sizes. The support bars 204 are shown in FIG. 4 in two positions. The support bars 204 are shown in their retracted position and in their fully extended position with reference numeral 206, for tires having an 18" bead. As shown in FIGS. 2–4, the support bars 204 and the pivot arms 104 are arranged such that all the tires picked up by the tire end effector assembly 20 are concentric about a vertical axis or centerline 20a of the end effector assembly 20. This ensures that the upper tires T remain centered above the lowermost tire T1 as shown in FIG. 1. The vertical support bars 204 are covered with a compliant material that allows tires T of similar bead sizes to be picked up by the end effector assembly 20. By picking multiple tires T from the infeed conveyor before moving to stack them on the floor reduces the number of trips to and from pick and stack locations.

Referring to FIG. 2, it is to be understood that the end effector assembly 20 is positioned over the top and center of the tire or stack of tires. The end effector assembly 20 is lowered through the bead diameter of one or more tires T with the pivot arms 104 and the support bars 204 in their fully retracted position. In order to lift the entire stack of tires T as shown in FIG. 2, the bottom assembly 100 descends to a level slightly below the bottom bead of the lowermost tire T1. The pivot arms 104 are radially extended until the fingers 108 meet the inside diameter of the bottom bead of the lowermost tire T1. The support bars 204 are then extended outwardly until the support bars 204 firmly bear against the inside diameter of the upper tires T of the stack. As can be seen in FIG. 2, the support bars 204 follow an arcuate path as they extend outwardly. The support bars 204 extend outwardly until such time that the weight of the upper tires T is removed from the lowermost tire T1. At this point, the end effector assembly 20 is ready to lift and transport the stack of tires.

Figure 8:
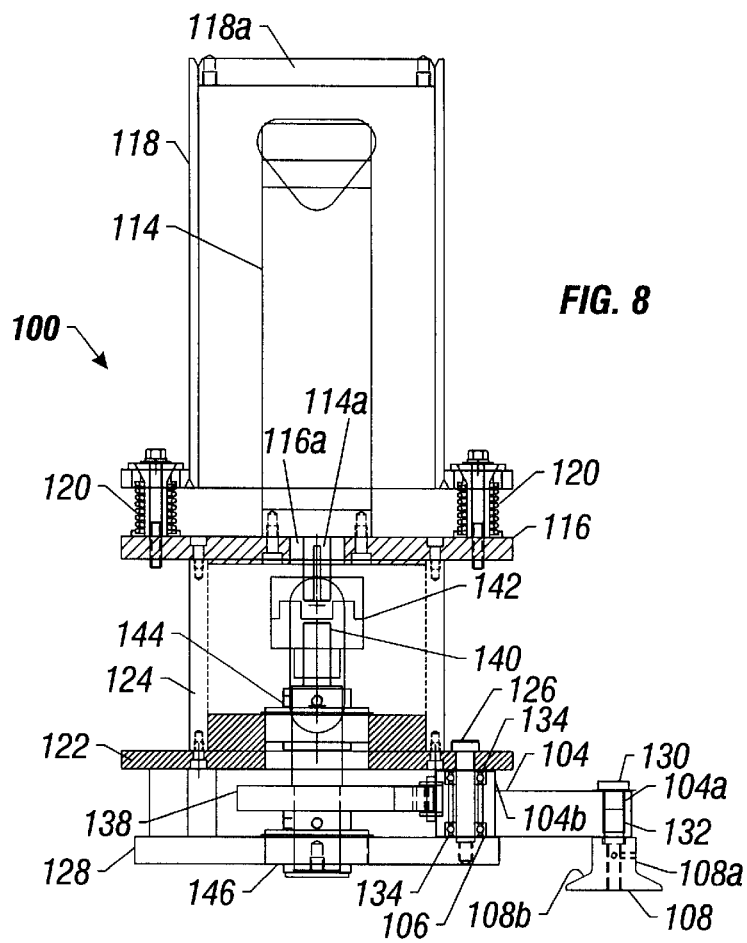
FIG. 8 is an elevation view of the bottom assembly of the tire end effector assembly with two of the pivot arms and fingers not shown for clarity.
Figure 9:
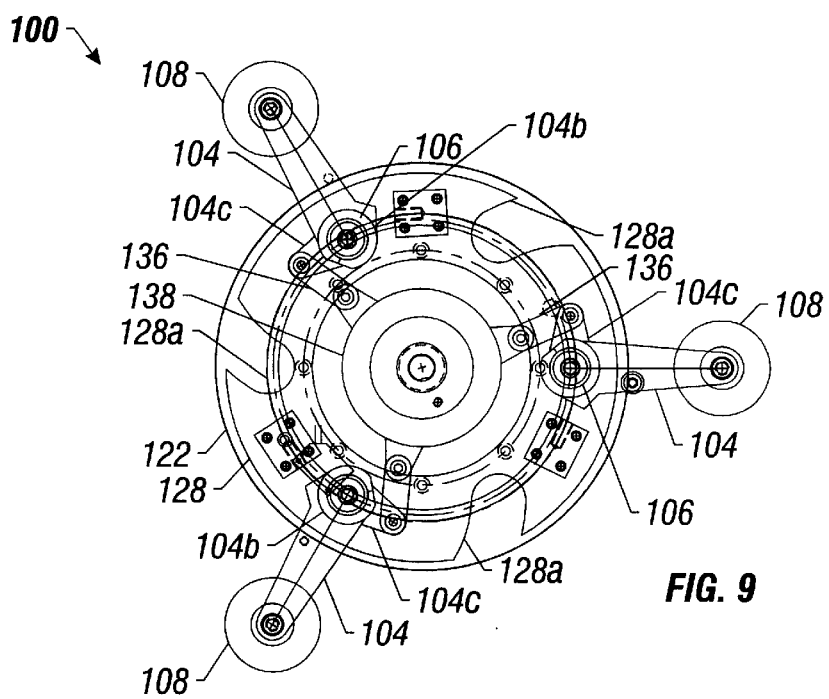
FIG. 9 is a plan view of the lower portion of the bottom assembly of the tire end effector assembly of FIG. 8 showing the pivot arms in the expanded position.
Figure 11:
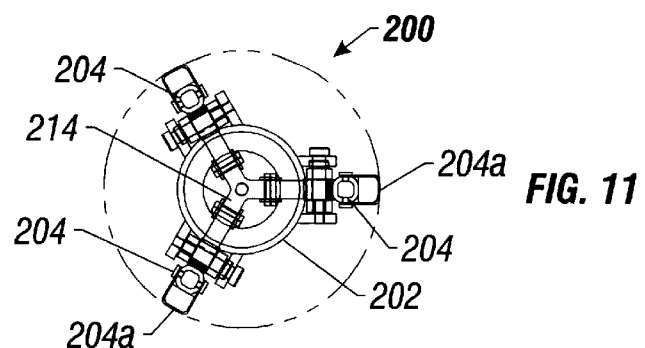
FIG. 11 is a plan view of the totem support assembly showing the support bars in a retracted position.
Figure 14:
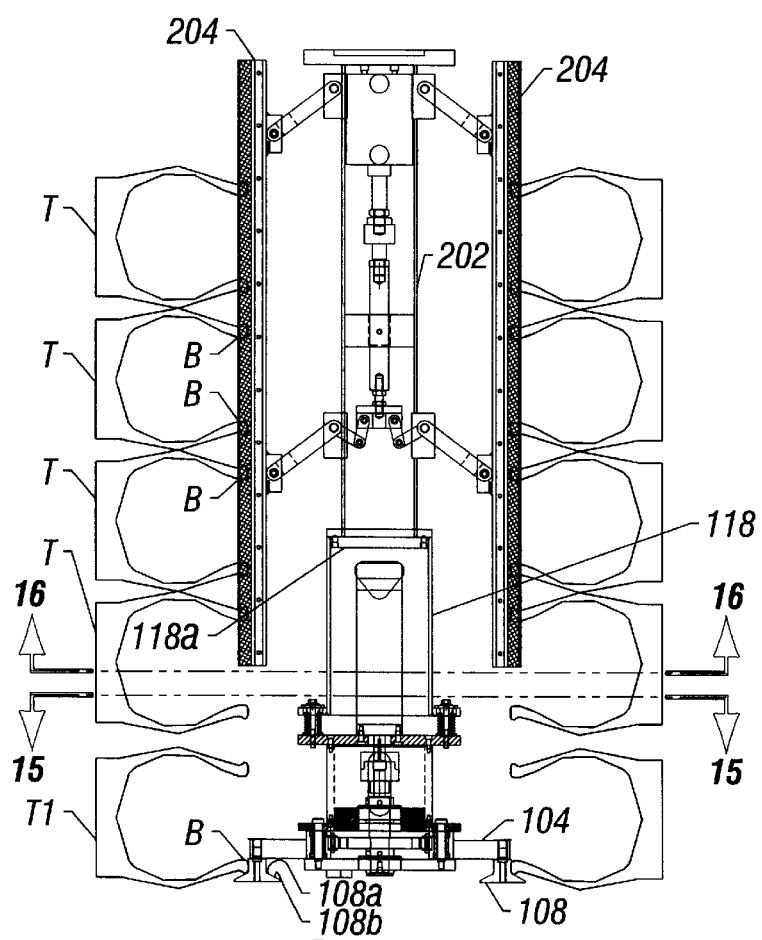
FIG. 14 is an elevation view of the robotic tire end effector assembly according to the present invention showing the pivot arms and the support bars in expanded positions.

A more detailed discussion of the robotic tire end effector assembly 20 will now be explained with reference to FIGS. 5–16. FIGS. 8 and 9 show the bottom assembly 100 of the tire end effector assembly 20. The bottom assembly 100 includes an actuator 114, preferably a rotary actuator, mounted to a top plate 116. The rotary actuator 114 is housed within an actuator housing 118. The actuator housing 118 includes an end plate 118a. The end plate 118a of the actuator housing 118 is preferably mounted to the arm support housing 202 (FIG. 14). Preferably, the top plate 116 and the actuator housing 118 are spring-mounted with a plurality of bolts and springs as indicated at 120 in FIG. 8.

Referring to FIG. 8, a main plate 122 is secured to a support housing 124 which is mounted to the lower face of the top plate 116. A plurality of shoulder bolts 126 extend through holes in the main plate 122 and are threadedly engaged with a bottom plate 128.

As shown in FIGS. 8 and 9, positioned between the main plate 122 and the bottom plate 128 is the plurality of pivot arms 104. The outermost portion of the pivot arms 104 includes a bore 104a receiving a shoulder bolt 130 and one or more bearings 132. The shoulder bolt 130 and bearings 132 rotatably mounts a finger 108 to the lower side of the pivot arm 104. As shown in FIG. 8, the finger 108 includes an upper vertical cylindrical portion 108a and a lower tapered portion 108b for reasons which will be explained below. It is to be understood that the finger 108 is allowed to rotate about the vertical axis of the shoulder bolt 130. It is also to be understood that the upper vertical portion 108a of the finger 108 extends beyond the outermost end of the pivot arm 104, as shown in FIG. 8.

Referring to FIG. 8, the innermost portion of the pivot arm 104 includes a hub 104b housing one or more bearings 134. Preferably, the shoulder bolt 126 extends through the hub 104b and bearing 134 to provide the pivot connection 106. Referring to FIG. 9, the pivot arm 104 also includes an ear 104c that is pin-connected to a master link 136. The master link 136 is also pin-connected to a linkage arm assembly 138. As shown in FIG. 9, the linkage arm assembly 138 is pin-connected to the three pivot arms 104 via the master links 136.

As stated above, FIG. 9 shows the pivot arms 104 in the fully extended position. The bottom plate 128 includes a plurality of cutouts 128a around the periphery which permit the pivot arms 104 and the vertical portion 108a of the fingers 108 to be fully retracted within the periphery of the main plate 122.

It is to be understood that the position of the pivot arms 104 is controlled by rotating the linkage arm assembly 138. The rotation of the linkage arm assembly 138 is controlled by the rotary actuator 114. Referring to FIG. 8, the top plate 116 includes a central bore 116a through which extends an actuator shaft 114a of the rotary actuator 114. A drive shaft 140 is coupled to the actuator shaft 114a with a mating coupling 142. The drive shaft 140 extends through the main plate 122, the linkage arm assembly 138, and the bottom plate 128. A bearing 144 is positioned between the drive shaft 140 and the main plate 122 and a bearing 146 is positioned between the drive shaft 140 and the bottom plate 128. The main and bottom plates 122 and 128, respectively and the bearings 144 and 146 maintain the vertical alignment and positioning of the linkage arm assembly 138 and allow the smooth rotation of the drive shaft 140 to control the position of the pivot arms 104 during operation.

The totem support assembly 200 will now be described with reference to FIGS. 10–13. The totem support assembly 200 includes the arm support housing 202 and the plurality of support bars 204. For clarity in understanding the present invention, it is to be understood that the arm support housing 202 is shown in the concept drawings of FIGS. 2–4 as a square tubular member whereas in FIGS. 5–7 and 10–16 the arm support housing 202 is shown as a round tubular member. Similarly, it is to be noted that the concept drawings of FIGS. 2–4 illustrate using four support bars 204 whereas FIGS. 5–7 and 10–16 show three support bars 204.

Figure 5:
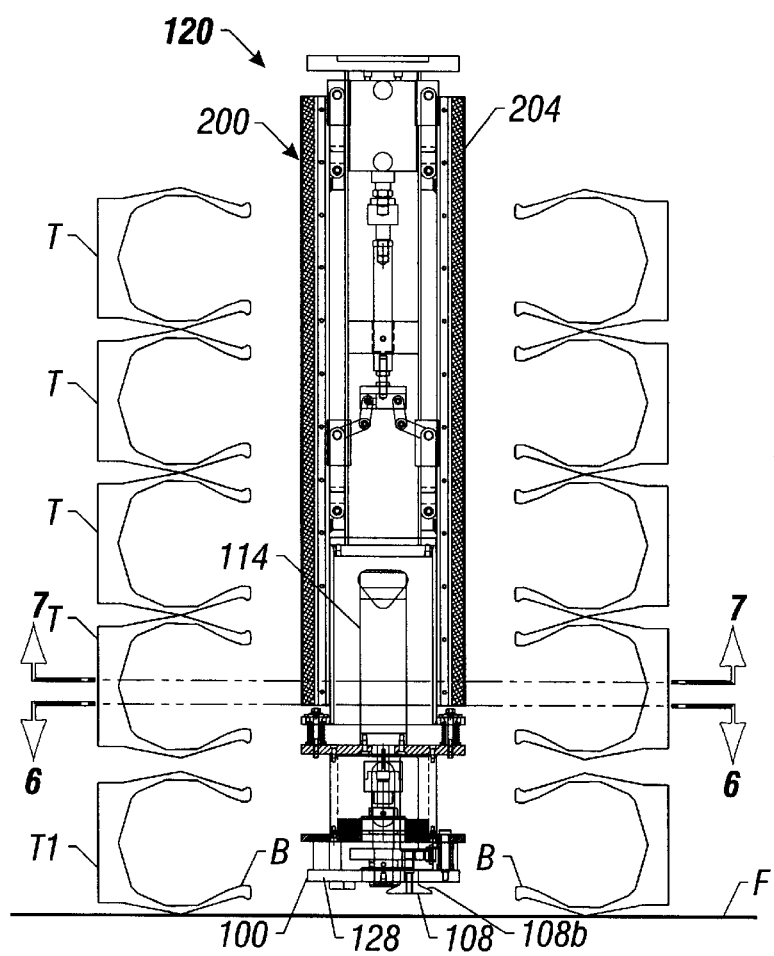
FIG. 5 is an elevation view of the robotic tire end effector assembly according to the present invention in a retracted position.
Figure 6:
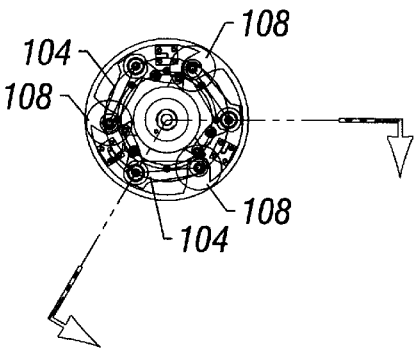
FIG. 6 is a view taken along line 6—6 of FIG. 5.
Figure 10:
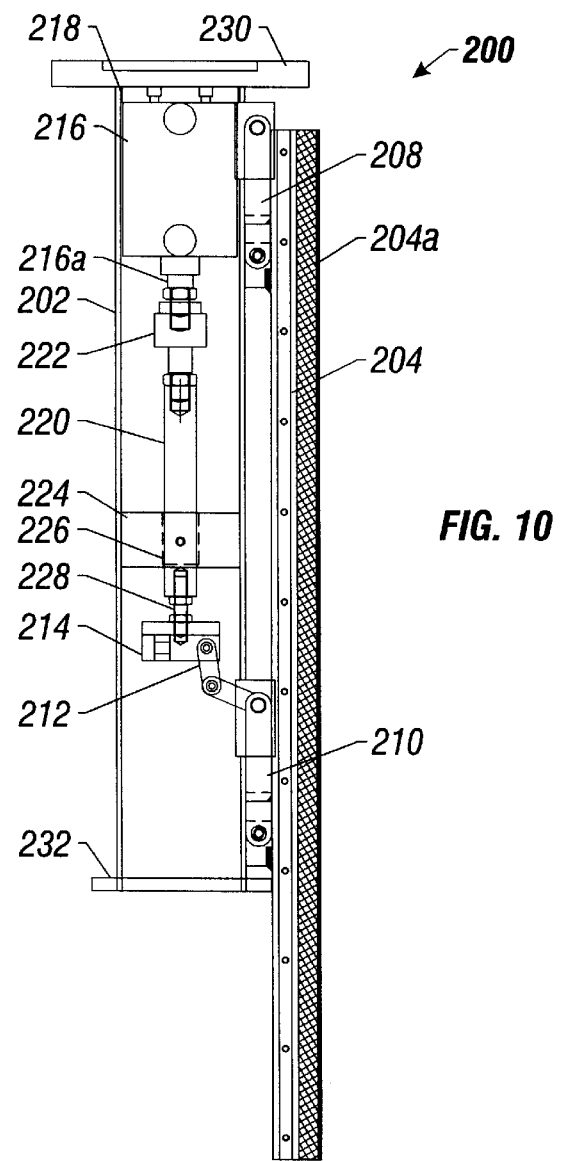
FIG. 10 is an elevation view of the totem support assembly showing a support bar in a retracted position with two of the support bars not shown for clarity.
Figure 13:
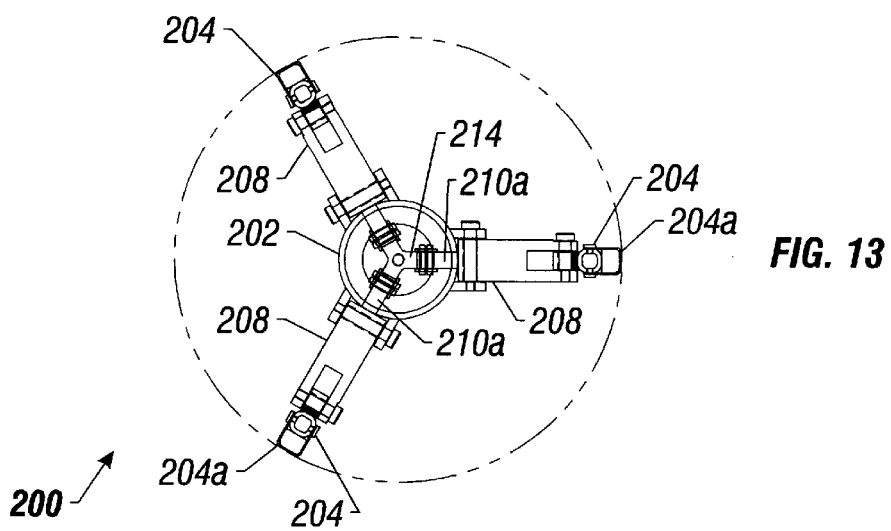
FIG. 13 is a plan view of the totem support assembly showing the support bars in an expanded position.
Figure 12:
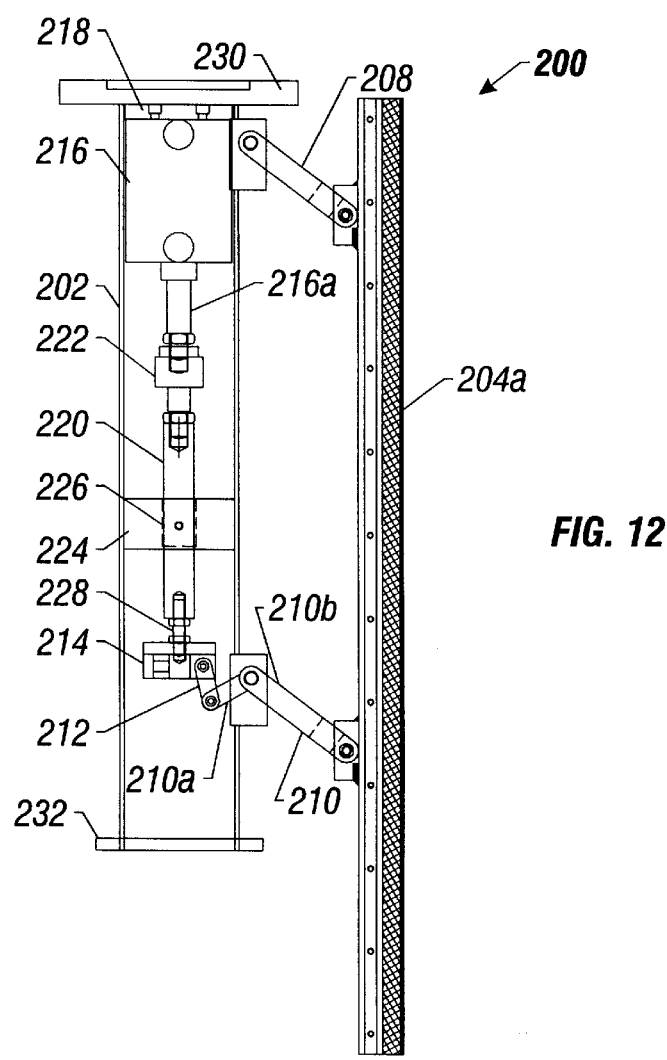
FIG. 12 is an elevation view of the totem support assembly showing one of the support bars in an expanded position with two of the support bars not shown for clarity.

Referring to FIGS. 10 and 12, the arm support housing 202 includes an upper mounting plate 230 and a lower mounting plate 232. It is to be understood that the upper mounting plate 230 is adapted to mount the arm support housing 202 to the mast 32 (FIG. 1) and the lower mounting plate 232 is adapted to mount the bottom assembly 100 to the arm support housing 202 as shown in FIGS. 5 and 14.

Referring to FIG. 12, each support bar 204 is pin-connected to upper and lower linkage arms 208 and 210, respectively. The upper and lower linkage arms 208 and 210, respectively, are each pin-connected to the arm support housing 202. The lower linkage arm 210 includes an ear 210a in a fixed angular relation relative to the main arm 210b of the lower linkage arm 210 as shown in FIGS. 10 and 12. The ear 210a extends into the bore of the arm support housing 202. A master link 212 is pin-connected to the ear 210a at one end and pin-connected to a linkage mounting plate 214 at a second end.

Referring to FIGS. 10 and 12, a pneumatic cylinder 216, preferably a double wall cylinder, is mounted to a cylinder mount plate 218 at the upper end of the arm support housing 202. It is to be understood that the cylinder 216 is not limited to a pneumatic cylinder but could also be a hydraulic cylinder. A cylinder rod 216a of the pneumatic cylinder 216 is coupled to a tie bar 220 via a coupler 222. The tie bar 220 extends through a tie bar support 224 mounted within the arm support housing 202. A bearing 226 is positioned between the tie bar 220 and the tie bar support 224. The linkage mounting plate 214 is connected to the lower end of the tie bar 220, preferably with a stud bolt 228.

By comparing FIGS. 10 and 12, one can see that when the cylinder rod 216a is retracted in the pneumatic cylinder 216 the support bars 204 are in the retracted position (FIG. 10) and by extending the cylinder rod 216a the support bars 204 are extended (FIG. 12). It is also to be understood that the support bars 204 always remain in a substantially vertical position.

Preferably, the outer face of the support bars 204 includes a deformable strip 204a which bears against the bead of the tire T during transport. The deformable strip 204a may be made from various materials including, but not limited to, open or closed cell foam, covered with a natural rubber. Preferably, the deformable strip 204a is compliant.

The operation of the robotic tire end effector assembly 20 will now be discussed in greater detail. It is to be understood that the robotic tire end effector assembly 20, including the manipulator 30, mast 32, and other equipment in the handling and palletizing system is preferably controlled by a computer C (FIG. 1) that has been programmed to receive and process data relating to the tires. The operation will first discuss the picking up of a single tire T1 positioned on the infeed conveyor 24 (FIG. 1) or on the floor F or a top tire of a stack of tires. The robotic tire end effector assembly 20 is moved over the top and center of the tire T1 with the support bars 204 and the pivot arms 104 in their retracted positions as shown in FIG. 5. For purposes of this discussion, assume that the tire T1 in FIG. 5 has no tires T stacked on top of it. The end effector bottom assembly 100 descends to a level slightly below the bottom bead B on the inside diameter of the tire T1. The tapered portion 108b of the finger 108 is preferably at or below the bottom bead B. The rotary actuator 114 is activated to pivot the pivot arms 104 through an arc. As shown in FIG. 14, the pivot arms 104 arc outwardly until the vertical portion 108a of the fingers 108 firmly contacts the inside diameter of the bottom bead B of the tire T1. As the pivot arms 104 pass through the arc towards the tire bead B, the fingers 108 are allowed to rotate as the tapered portion 108b of the fingers 108 contact the sidewall of the tire T1. The end effector assembly 20 lifts the tire T1 and moves to place it onto the floor, a pallet, or other transport mechanism, or the end effector assembly 20 may move over the top and center of another tire, setting the first tire T1 onto it. When the tire T1 is brought to the desired location, the rotary actuator 114 retracts the pivot arms 104 and fingers 108 to their initial retracted position.

Figure 15:
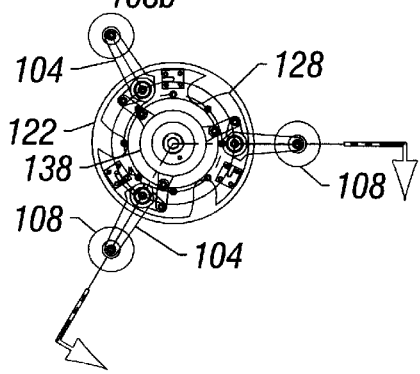
FIG. 15 is a view taken along line 15—15 of FIG. 14 showing the pivot arms in an expanded position.

The operation of picking up a stack of tires will now be discussed. The initial steps as discussed above for picking up a single tire are repeated. The robotic tire end effector assembly 20 is moved over the top and center of the stack of tires T with the support bars 204 and the pivot arms 104 in their retracted positions as shown in FIG. 5. The end effector bottom assembly 100 descends to a level slightly below the bottom bead B on the inside diameter of the lowermost tire T1. The tapered portion 108b of the finger 108 is preferably below the bottom bead B of the tire T1. The rotary actuator 114 is activated to pivot the pivot arms 104 through an arc. As shown in FIGS. 14 and 15, the pivot arms 104 arc outwardly until the vertical portion 108a of the fingers 108 firmly contacts the inside diameter of the bottom bead B of the tire T1. As the pivot arms 104 pass through the arc towards the tire bead B, the fingers 108 are allowed to rotate as the tapered portion 108b of the fingers 108 contact the sidewall of the tire T1.

Figure 16:
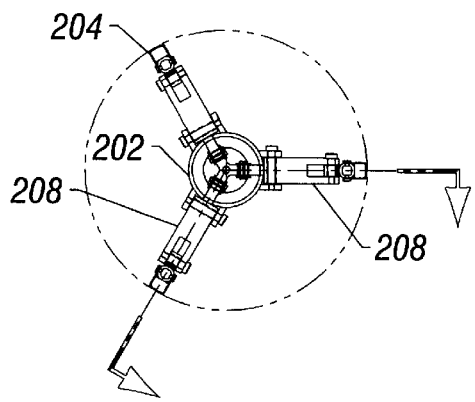
FIG. 16 is a view taken along line 16—16 of FIG. 14 showing the support bars in an expanded position.

Referring to FIGS. 14 and 16, the support bars 204 are then extended outwardly until the support bars 204 firmly bear against the inside diameter of the beads B of one or more of the upper tires T of the stack. As can be seen in FIG. 14, the support bars 204 follow an arcuate path as they extend outwardly. The support bars 204 extend outwardly until such time that the weight of the upper tires T is removed from the lowermost tire T1. At this point, the end effector assembly 20 is ready to lift and transport the stack of tires. The end effector assembly 20 lifts the stack of tires T and moves to place it onto the floor, a pallet, or other transport mechanism, or the end effector assembly 20 may move over the top and center of another tire, setting the stack of tires T onto it. In setting the stack of tires T down, preferably the pivot arms 104 are first retracted and then the support bars 204 are retracted.

It is important to understand that the process of lifting and transporting a stack of tires T as described above prevents damage to the lower tire T1. While it is acceptable to stack several tires T on top of one another, it is not acceptable to lift more than one or possibly two tires from the inside diameter of the lower tire bead B with the minimal surface contact lift points provided by the fingers 108. To have the weight of several tires T on the lowermost tire T1 during lifting of the stack of tires T with the bottom assembly 100 would likely result in damage to the lowermost tire T1. Thus, it is very important that the support bars 204 swing upwardly through an arc and slightly lift the stack of tires T above the lowermost tire T1 prior to the robotic tire end effector assembly 20 lifting the lowermost tire T1. It is to be understood that this requirement may not be applicable to certain types of tires but is applicable to most vehicle tires.

While not shown in the drawings, it is also to be understood that the robotic tire end effector assembly 20 can also be used to pick up a stack of tires T having different bead sizes. For example, by referring to FIG. 5, the end effector assembly 20 can place the four upper tires T onto the lowermost tire T1. The four upper tires T may have a bead size of 14" whereas the bead size of the lowermost tire T1 may be 18". As explained above, the lowermost tire T1 will be supported by the pivot arms 104 and the upper stack of the tires T will be independently supported by the support bars 204. The robotic tire end effector assembly 20 can then transport the entire stack and distribute the lowermost tire T1 to its desired location on the floor F, a pallet or onto another tire T by the process described above in which the pivot arms 104 are retracted and then the support bars 204 are retracted. The end effector assembly 20 is then repositioned to slightly below the bottom bead B of the lower 14" tire stacked on the 18" tire. The pivot arms 104 are extended out until they bear firmly against the tire bead B and then the support bars 204 are extended outward to support the other tires. At this time the end effector assembly 20 can transport the four 14" tires to their desired location.

It is to be understood that numerous possibilities of combinations of sizes and types of tires T can be picked up together with the end effector assembly 20 of the present invention. There are some limitations on the range of bead sizes that can be picked up at a single time with the support bars 204. The support bars 204 remain vertical and parallel to one another and will extend outwardly only as far as the smallest bead size tire being picked up by the support bars 204. Due to the potential of damaging tires or not maintaining vertical stacks of tires, it is not desirable to have tires with a significant range of bead sizes supported by the support bars 204 at the same time. The computer can be programmed to provide the acceptable limits of range of tire sizes or the combinations allowed for support by the support bars 204 during a single lift. As the vertical support bars 204 are extended upward, the weight of each tire T is supported by it's own bead.

The computer software makes intelligent decisions about the picking and placing of tires and stacks of tires. The control and software optimize the tire stacking and palletizing process. The control decides when it is best to pick more than one tire at a time and the most efficient path to place each tire and stack of tires.

Overall Product Flow Through Palletizing System

Tires flow through the palletizing system in several stages. The various stages of product handling are interlocked and are very closely interdependent. The product handling stages, described below, are:

1. Tire Infeed Accumulation Staging
2. Tire Identification
3. Tire Tracking and Distribution to Robot Modules
4. Tire Stacking and Sorting by Robot Modules
5. Removing Full Pallets From the System 1. Tire Infeed Accumulation Staging Tires T enter the palletizing system via the infeed conveyor 24. The infeed conveyor 24 brings finished tires T from the end of the manufacturing process to the palletizing area. The infeed conveyor 24 is configured and controlled such that tires T may be "accumulated." If the palletizing system falls behind, the tires T are stacked as densely as possible on the infeed conveyor 24 to create an inline storage area. When the robot is operating at capacity, the infeed conveyor system 24 feeds tires T at full speed to the palletizing system. This alleviates the need to start and stop the system often.

2. Tire Identification

The tire identification process is adaptable to several different identification methods, particularly, manual and automatic identification processes. In the manual identification process, the tires T are distributed to several spur conveyors. Each spur conveyor transports a percentage of the tire flow past an operator. The operator identifies the tire T and enters an identification code into a computer terminal. The identification code is transmitted to the palletizing system. Once the tire T is identified it is tracked throughout the system.

In the automatic identification process, the tires T are presented one at a time to an identification device. This device may be a barcode reader, vision system, or equivalent. Once the tire T has been identified, the identification code is received by the palletizing system and the tire T is then tracked throughout the system.

3. Tire Tracking and Distribution to Robot Modules

This step in the procedure is crucial for avoiding bottlenecks and balancing the workload across multiple robotic palletizing modules. When a tire T is identified it must be grouped with like kind tires under a specific robot module for stacking and sorting. As new types of tires T arrive, it becomes necessary to "find them a home," that is, select a robot module to process this new type of tire T. Preferably, this process examines several factors as follows:

a. Tire characteristics such as physical size, production rates, and any other special requirements that are pertinent.
b. Current workload for each robot module. This is the percent "free time" each robot module has available to process a new tire type.
c. The amount of work scheduled for each robot module in the short term future.
d. The total capacity of each robot module since different robot modules have different throughput capacities.

Some of these factors are static database type of input while some of the factors are instantaneous, real time data gathered from the various robot modules on the fly. Once the optimum robot module has been selected, the tire T is given a destination and transported and tracked to the destination robot module.

4. Tire Stacking and Sorting by Robot Modules

When tires T arrive at the robot module, the tires are picked and stacked into like specific groups. A vertical stack of tires T called a "totem pole" is created. The totem poles are recipe driven and may be stacks of all like kind tires, or specific combinations of different types of tires that must be stacked together. Preferably, totem poles are placed in a densely packed fashion on the factory floor F. The arrangement of totem poles on the floor F, directly affects the required floor space and therefore, the feasibility, of the palletizing system.

Preferably, the stacking and sorting process continues until the correct number of totem poles has been created to complete a full pallet load of tires T. At this point the tires T are picked up again by the robot module, one entire totem pole at a time, and placed onto an empty pallet. The pallet 28 is removed after being loaded with the totem poles of stacked tires.

There are several distinguishing features of the robotic tire end effector assembly 20 of the present invention that make possible the entire process. The side support bars 204 operate independently from the lower swing out pivot arms 104 and make it possible to pick more than one tire T at once. In fact, the end effector assembly 20 will simultaneously pick tires T of different inside diameter bead size. The side support bars 204 allow this to take place without placing any extra load on the bottom tire T1. The side support bars 204 lift and support each tire T independently.

Other significant advantages of the robotic tire end effector assembly 20 include the ability to pick more than one tire T at a time from the infeed conveyor 24. This feature is key to the throughput of the system. Transporting more than one tire T at a time multiplies the robot module's efficiency. Additionally, tires T can be placed one at a time. Not only can the end effector assembly 20 pick multiple tires T of different sizes and types from the infeed conveyors 24, but can also sort/stack/distribute the tires T to their respective destination totem poles. This saves considerable travel time on the part of the robot module. Further, the robotic tire end effector assembly 20 can pick entire, full height totem poles and place them onto a pallet resulting in considerably time and space savings.

Preferably, the computer software and system evaluates all of these factors and variables and makes the best decision about what palletizing steps to take, at what time, to ensure the optimum system throughput. Preferably, the following tools are utilized to optimize system throughput:

Pick Optimization. At pick time, the robot module has access to 4 or 5 tires T simultaneously. The robot will examine the available "pickable" tires T and make some evaluations:
  Are there two or more identical tires T available for picking right now?
  Are there two or more tires T available for picking right now that belong on the same totem pole?
  What is the destination of each tire T?
  What tires T are going to totem poles that are located close to each other?
  What tires T can safely be picked together by the end effector assembly 20?

Stacking Path Optimization. In this process the robot examines information regarding the order the tires T should be placed.

Overall System Awareness. Several other factors are evaluated:
  Are there totem poles that should be moved to pallets at this time?
  How backed up are the infeed conveyors 24?
  Should one robot module be assisting a partner robot module. Many robot modules are two headed. The two heads cooperate together to accomplish the palletizing task.

Preferably, an exhaustive comparison of every possible combination of choices is continuously calculated. In this way the robot can always choose the most efficient combination of actions. Sometimes this means picking multiple tires T at once, sometimes not; sometimes it means stacking totem poles and leave picking individual tires T for a later time.

5. Removing Full Pallets From the System

When fully loaded pallets 28 are completed by the robot module they are removed from the system by a servo-controlled railcar or powered outfeed conveyor 26. Fully loaded pallets 28 may be stretch-wrapped for stability. Oftentimes a full data report is created and transmitted to a host computer for inventory purposes.

Figure 17:
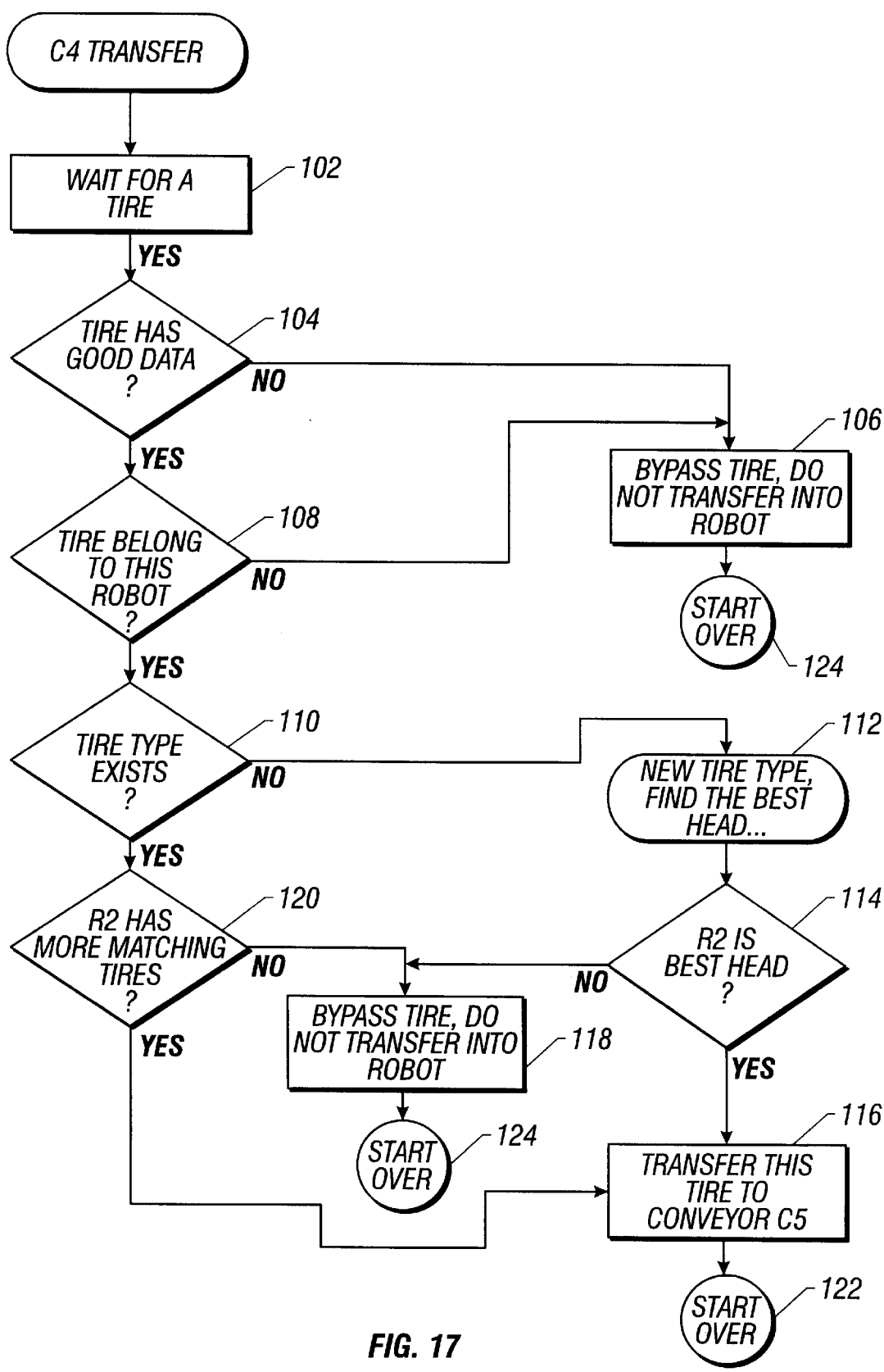
FIGS. 17 through 20 are schematic block diagrams of the logic sequences which form a part of the present invention.

To more fully illustrate the computer software control program, the logic sequences will now be described with reference to FIGS. 17–20. FIG. 17 illustrates sequence steps involved in tire tracking and distribution to robot modules. Step 102 involves an automatic identification device of a conveyor waiting for a tire. When a tire is received by the identification device, step 104 verifies that the tire has been positively identified and correctly tracked to the transfer conveyor. If not, the tire is bypassed and not transferred to the infeed conveyor in step 106. If correct, step 108 determines if the conveyor is transporting tires that belong to the particular gantry depending on the configuration of multiple robots. Once again if not, the tire is bypassed and not transferred to the infeed conveyor in step 106. If the tire does belong to the particular gantry, step 110 checks to see if there are tires of this type already under the robot. If not, the tire still belongs here and the best head must be found for the tire in step 112. Step 114 determines if the robot head is the best head by considering available floor space and number of different tire types. If the robot head is the best head, the tire is transferred to the infeed conveyor for the robot in step 116. If the particular robot head is not the best, the tire is bypassed and not transferred to the particular robot head in step 118 and the process is started over. If step 110 determines that tires of this type are already under the robot, step 120 determines which head has the highest number of tires of this type. This helps to conserve floor space and gives the robot more multi-picks of tires. If this robot does not have the highest number of tires of this type, the tire is bypassed and not transferred to this robot in step 118. If this robot does have the highest number of tires of this type, the tire is transferred to this conveyor in step 116. Following the transfer to this conveyor the process is started over in step 122. Following the bypass of the tire, the process is started over in step 124.

Figure 18:
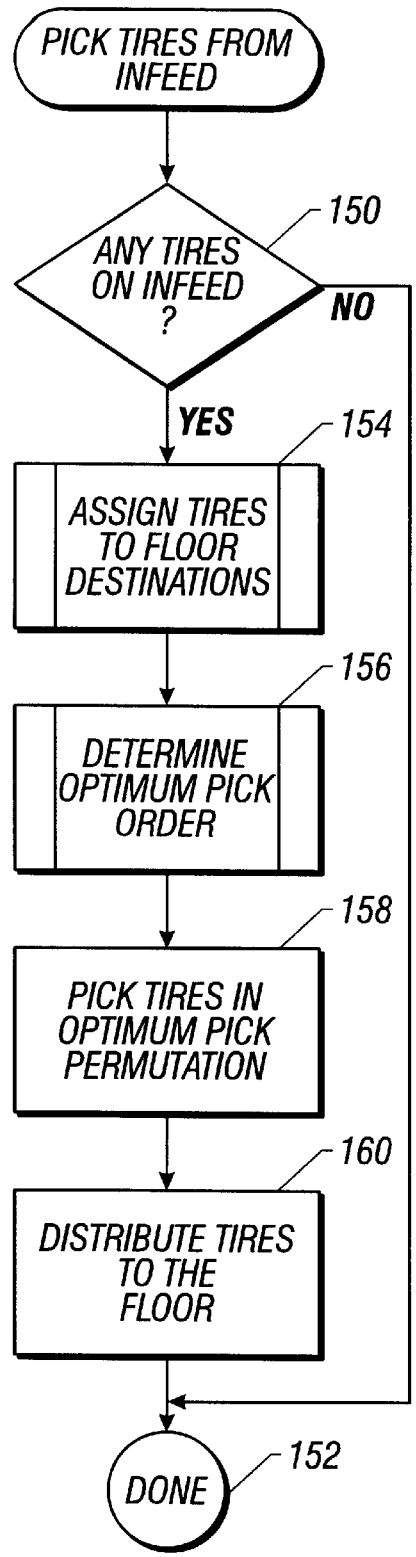

In FIG. 18, the steps involved in the process of picking tires from the infeed conveyor are illustrated. Step 150 determines if any tires are on the infeed conveyor. If not, there are no tires to pick and the process is done as in step 152. If there are tires on the infeed conveyor, step 154 assigns tires to floor destinations. Step 156 determines the optimum pick order and step 158 has the robotic tire end effector pick the tires in optimum permutation. Step 160 has the robotic tire end effector distribute the tires to the floor and the process is the done.

Figure 19:
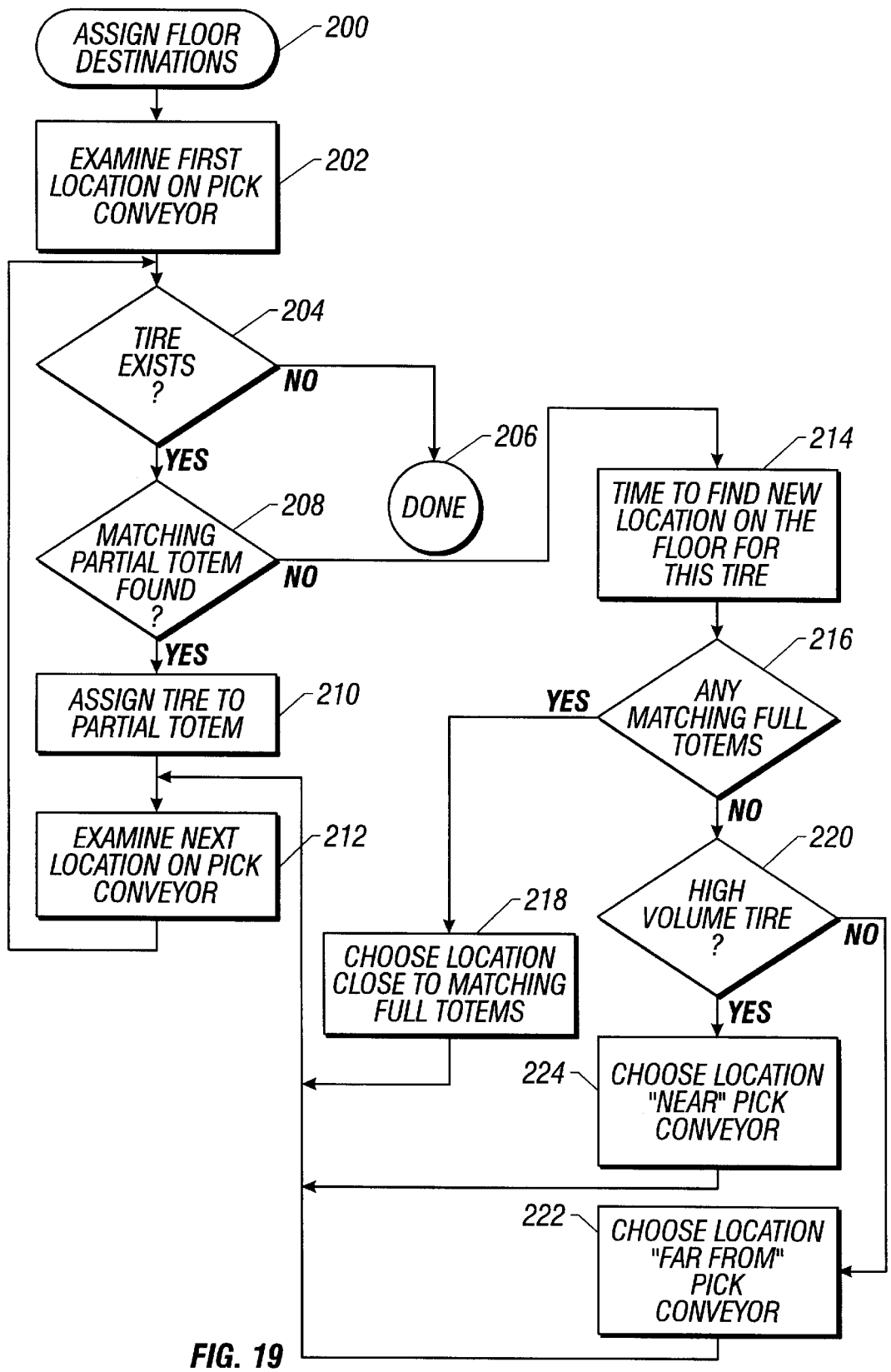

A more detailed analysis of assigning floor destinations is shown in FIG. 19. Step 200 involves assigning tire types floor destinations. Step 202 involves looking at each tire accumulation location on the infeed conveyor beginning with the last position and working your way upstream. Step 204 checks that the tire physically exists and has good data. If not, the process is done in step 206. If the tire exists and has good data, step 208 determines if a partial totem of the same type of tire already exists on the floor. If so, the tire is assigned to the partial totem in step 210 and the next location on the pick conveyor is examined in step 212 and the process returns to step 204.

If in step 208, there is not a partial totem of the same type of tire already existing on the floor, step 214 seeks to find new location on the floor for this tire. In finding a new location, preferably step 216 looks for any matching full totems. If so, step 218 chooses the location close to the matching full totems. The process then examines the next location on pick conveyor of step 212. If, however, there are no matching full totems in step 216, step 220 determines if the tire is a high volume tire. If the tire is not a high volume tire, step 222 chooses the location "far from" the pick conveyor and the process returns to step 204. If the tire is a high volume tire as determined in step 220, step 224 chooses a tire location "near" the pick conveyor and the process returns to step 204.

Figure 20:
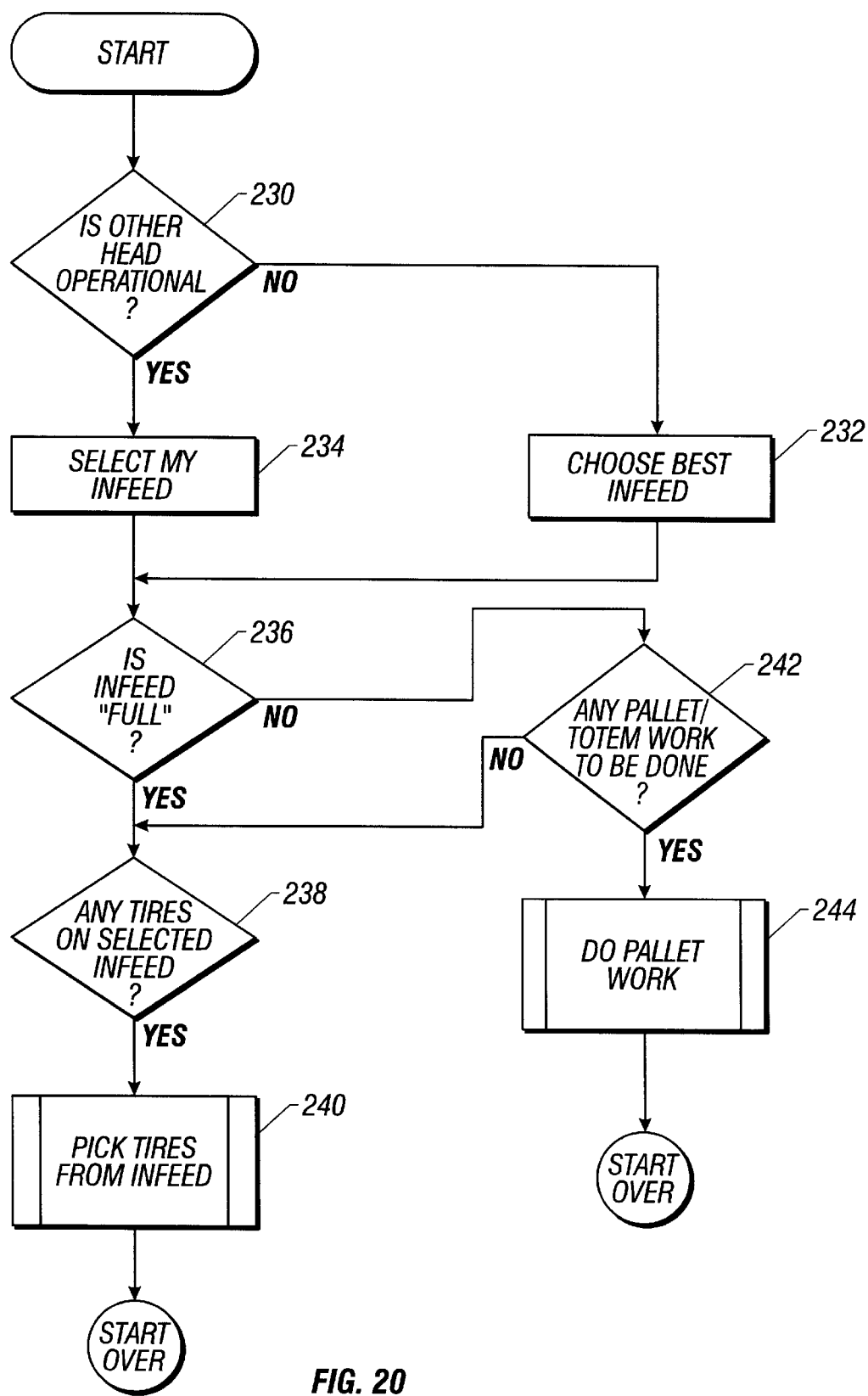

In FIG. 20, the steps involved in the process of palletizing and selecting tires is disclosed. With reference to FIG. 21, the first step to 30 is to determine whether both robot end effector assemblies 20 and 20 prime are operational. For example, one end effector assembly could be parked, in maintenance or in manual mode. As shown in FIG. 21, the end effector assembly 20 is primarily assigned to pick up conveyor 25 and end effector assembly 20 prime is primarily assigned to pick up conveyor 25 prime. If one robotic end effector assembly is not operational, the program chooses the best end feed pick up conveyor in step 232. In step 234, if both robotic end effector assemblies are operational, it selects its end feed pick up conveyor. The next step, 236, is to determine if the end feed pick up conveyor is full. If an end feed conveyor is full the end effector assembly determines if any tires are on the selected in feed pick up conveyor in step 238. In step 240, the tires are picked from the end feed pick up conveyor and the process starts over. In step 236, if the end feed pick up conveyor is not full, step 242 inquires whether there is any pallet and totem work to be done. If not, the next step is to determine if there are any tires on the selected end feed pick up conveyor in step 238. If there is pallet and totem work to be done in step 242, the robotic end effector assembly does the pallet work in step 244 and the process then starts over.

The foregoing disclosure and description of the invention are illustrative and explanatory thereof, and various changes in the details of the illustrated apparatus and construction and method of operation may be made without departing from the spirit of the invention.

What is claimed is:

1. A robotic tire end effect or apparatus for picking up and placing tires positioned horizontally onto vertical stacks of tires, the apparatus comprising:
    a totem support assembly having a plurality of support bars capable of bearing against the inside diameter of a tire bead; and
    a bottom assembly mounted to said totem support assembly, said bottom assembly having a plurality of pivot arms and fingers, said fingers capable of bearing against the inside diameter of a tire bead and supporting the weight of a tire;
    a computer system comprising a computer programmed to receive tire identification information, trace tire location, control tire allocation, pick optimization and continuous calculation of sorting and pick options by the assembly.

2. The tire end effector apparatus of claim 1, wherein said plurality of support bars are capable of supporting the weight of a tire.

3. The tire end effector apparatus of claim 1, wherein said totem support assembly further comprises a support housing and said plurality of support bars are mounted to said support housing.

4. The tire end effector apparatus of claim 3, wherein said bottom assembly is mounted to said support housing.

5. The tire end effector apparatus of claim 3, wherein said totem support assembly and said plurality of support bars are substantially vertical.

6. The tire end effector apparatus of claim 5, wherein said plurality of support bars are mounted to said support housing with a linkage assembly and said plurality of support bars are capable of a range of horizontal distances from said support housing.

7. The tire end effector apparatus of claim 6, further comprising means for positioning said plurality of support bars relative to said support housing.

8. The tire end effector apparatus of claim 6, further comprising a cylinder and rod assembly capable of positioning said plurality of support bars relative to said support housing.

9. The tire end effector apparatus of claim 1, wherein said support bars include a deformable strip adapted to bear against the tire bead.

10. The tire end effector apparatus of claim 1, wherein said bottom assembly further comprises a means for actuating said plurality of pivot arms.

11. The tire end effector apparatus of claim 1, wherein said bottom assembly further comprises a rotary actuator for actuating said plurality of pivot arms.

12. A method of picking up a stack of tires with a robotic tire end effector assembly having a plurality of upper vertical support bars and a plurality of lower pivot arms and fingers, the method comprising the steps of:
    positioning the end effector assembly over the top and center of the stack of tires;
    lowering the end effector assembly through the bead diameters of the stack of tires with the lower pivot arms and the upper support bars in their fully retracted position;
    pivoting the lower pivot arms until the fingers firmly bear against the inside diameter of the bead of the lowermost tire;
    extending the support bars outwardly until the support bars firmly bear against the inside diameter of the upper tires of the stack;
    removing the weight of the upper tires from the lowermost tire in the stack; and
    raising the end effector assembly to lift the stack of tires.

13. The method of claim 12, after said step of raising the end effector assembly, further comprising the steps of:
    lowering the end effector assembly and the stack of tires to a support surface;
    retracting the pivot arms from the inside diameter of the tire bead; and
    retracting the support bars from the upper tires of the stack.

14. A method of handling and palletizing tires comprising the steps of:
    obtaining a tire identification from the tire on an infeed conveyor;
    assigning the tire to a floor destination;
    determining the optimum pick order of the tires from an infeed conveyor;
    picking the tires in the optimum pick order from the infeed conveyor; and
    stacking similar tires on stacks.

15. The method of claim 14 further comprising the steps of:
    distributing the tires to the floor; and
    moving stacks onto a pallet.

* * * * *